…

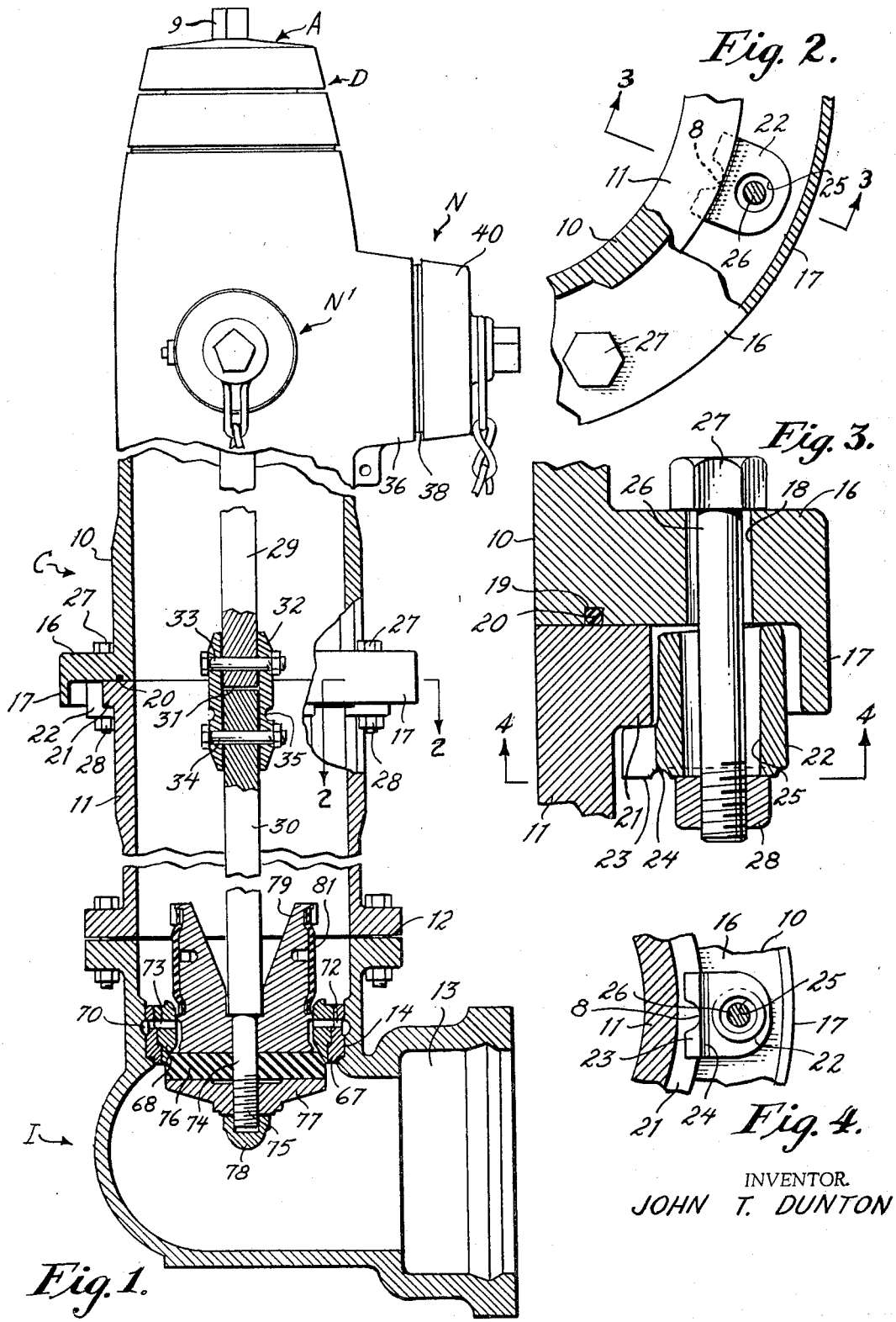

United States Patent Office 3,439,938
Patented Apr. 22, 1969

---

3,439,938
FIRE HYDRANT
John T. Dunton, Bradford, Pa., assignor to Dresser Industries, Inc., Dallas, Tex., a corporation of Delaware
Continuation-in-part of application Ser. No. 421,580, Jan. 18, 1965. This application Sept. 28, 1967, Ser. No. 687,940
Int. Cl. F16l 23/00, 57/00; F16k 17/40
U.S. Cl. 285—2        7 Claims

ABSTRACT OF THE DISCLOSURE

A fire hydrant having improved frangible casing and drive stem lock secured nozzle, valve operating structure and self draining valve. The casing parts have flanged ends and are held together by a plurality of pivotable lugs and bolts. Each lug has a weakened portion which is broken when the upper casing part is struck by a vehicle.

---

Cross-references to related applications

This application is a continuation-in-part of application Ser. No. 421,580 filed Jan. 18, 1965, now abandoned.

Background of the invention (1) The field of art to which the invention pertains includes the arts of fluid handling and pipe couplings as related specifically to fire hydrants.

(2) In accordance with present day standards and conventions, a fire hydrant includes a casing comprising two cylindrical parts and a shoe with two cylindrical parts being joined by a bolted flange connection. When the hydrant is installed at its place of usage, this connection is close to the ground surface. It is now recognized as desirable if not absolutely necessary, that the connection between the casing parts be frangible. Thus, if the hydrant is struck by a vehicle, the top part of the casing will come free at the frangible connection without damage to functional parts of the hydrant.

Since casing encloses a valve stem which extends from the operating mechanism at the top to the main valve at the bottom, the valve stem has also been required to be of two parts joined by a frangible connection.

Further, in accordance with the prior art practice, an intake shoe is connected to the lower end of the lower casing part. The intake is provided with a valve seat and houses a main valve which is normally urged against the seat by pressure of water in the main. The valve is opened by being moved downwardly against the water pressure.

It is now recognized as standard to provide a drain valve about the valve seat so that after the valve is closed, any water which remains in the casing will be drained to the exterior thereof. However, when the intake valve is opened, it is desirable that the drain valve be closed so that all the water coming from the intake will pass upwardly to the discharge nozzle at the top.

Yet further, in accordance with prior art practice the upper end of the casing is provided with a pair of discharge nozzles in right angular relation. Each of these nozzles consists essentially of a short sleeve having a central abutment flange. On the inner side of this flange, the sleeve is threaded and screwed into an internally threaded nipple on the casing. On the outer side of the flange, the nozzle is provided with threads which receive either a cap during a period of non-usage or a hose connection when the hydrant is being used.

While each of the above features has been satisfactorily operative on fire hydrants for decades it has been long recognized that the hydrants were less than optimum in construction and performance efficiency under conditions of actual use.

Summary

The present invention relates to a fire hydrant and is concerned primarily with certain improvements which result in improved utility of such hydrants. More specifically, by means of the invention hereof, each of the aforementioned components which have existed for decades in accordance with prior art standards are not constructed to provide enhanced utilization characteristics as to render the hydrant increasingly more efficient while achieving this result at lower manufacturing costs than heretofore.

It is therefore an important object of the present invention to provide a new and improved frangible connection between the casing parts. This improved connection consists essentially of a wide flange at the lower end of the upper casing part having a depending skirt and formed with bolt holes, a short flange on the upper end of the lower casing part opposite the said skirt, the lugs aligning with said holes in the upper casing flange. Each of these lugs carries an inwardly extending projection which engages the short flange and having a weakened connection between the projection and the lug. Thus, when the upper casing part is struck, the connection is broken at this weakened lug construction. Moreover, the top surface of the lug engages the wide flange in a manner whereby the lug will tilt or pivot in a deviation from the bolt axis by which it is tightened in forming the connection. This arrangement presents the advantage of permitting assembly between the casing parts through any compensating angular adjustment of the casing parts throughout the full 360°. At the same time, because the lugs are in metal-to-metal contact against both flanges, the applied bolt stress is not concentrated at the weakened fracture area but is shared by both flanges.

The invention therefore comprises a fire hydrant including a casing and valve stem having new and improved frangible connections.

Brief description of the drawings

FIGURE 1 is a side view partly in section and partly in elevation and with parts of the casing broken away, of a fire hydrant embodying the improvements of this invention.

FIGURE 2 is a detailed section through the frangible connection of the valve casing being taken about on the plane represented by the line 5—5 of FIGURE 1.

FIGURE 3 is another detail section taken on an enlarged scale of this frangible connection being taken about on the plane represented by the line 6—6 of FIGURE 2.

FIGURE 4 is still another detail of this connection being taken about on the plane represented by the line 7—7 of FIGURE 3.

The general assembly

A fire hydrant embodying the improvements of this invention comprises a casing which is referred to in its entirety by the reference character C. This casing C comprises an upper casing part 10 and a lower casing part 11. The parts are secured together by a frangible connection to be later described in detail. Secured to the lower end of the lower casing part 11 by a bolted flange connection 12 is an intake shoe I. The shoe I includes an intake opening at 13 which is connected to a water main and has a cylindrical bore 14 which receives a valve seat which will be later described.

The upper casing part 10 carries a plurality of discharge nozzles, each of which is referred to in its entirety by the reference character N and N' which are in right angular relation. Secured to the upper end of the upper casing part 10 by a threaded connection 15 is a dome D which in turn carries a dust cap A.

The frangible connections

Referring now more particularly to FIGURES 2, 3 and 4, integrally formed with the upper casing part 10 and at the lower end thereof is a comparatively wide outwardly extending flange 16 which in turn carries a depending skirt 17. The flange 16 is formed with a series of bolt holes 18. The lower end face of the casing part 10 has an annular groove 19 which receives an O-ring packing member 20 that engages the upper end face of the lower casing part 11. As will be understood, this avoids unwanted gasket loading on the frangible casing connection in the manner of the prior art wherein compression type gaskets are employed which cause the load to be additive with internal pressure against the connection.

The upper end of the lower casing part 11 is formed with a comparatively narrow outwardly extending flange 21 that is spaced from the skirt 17. A plurality of lugs 22 are received in this space, the number of lugs corresponding to the number of bolt holes 18. The top face of each lug has an inward draft or incline with respect to the axis of bolt hole 25 so that only the radially outer edge of each lug engages the underface of the flange 16. This eliminates the need for accurate machining of the casing parts while insuring that the mounting bolts are not subjected to a bending moment and that the frangible connection will not be unduly prestressed. Each lug 22 has integrally formed thereon an inwardly extending projection 23 with a notch or groove at 24 weakening the connection between the projection 23 and the main body of the lug 22. This projection 23 engages the under face of the flange 21 and is formed with an arcuate recess 8.

Each lug 22 aligns with a bolt hole 18 and in turn is provided with a bolt hole 25 usually of larger diameter than bolts 26 which pass therethrough. The difference in diameters should provide sufficient clearance to enable lug pivoting without exerting a bending moment against the bolts. Each bolt 26 has a head 27 at one end and a nut 28 at the other. When the nuts 28 are tightened, the two casing parts are clamped together in assembled relation and the O-ring 20 provides an effective water seal. Because the lug has a radially outer high point or area on its top surface by virtue of the oblique or inward draft thereat, it will tilt or pivot in a clockwise direction as viewed in FIGURE 6 as the bolt 26 is tightened. By means thereof as the lug axis deviably offsets from the bolt axis, it is evident that the casing parts 10 and 11 may be assembled regardless of their manufacturing mismatched angular relation by virtue of the compensation which the pivot action provides. At the same time, the metal-to-metal contact provided simultaneously by the lug at both flanges causes a load sharing thereat. This avoids concentrating the bolt stress at the fracture area to minimize the possibility of a premature unwanted fracture thereat under conditions at which failure is unexpected. When a vehicle or other object strikes the upper part 10 with sufficient force, the connection will break at the grooves 24 which weaken the connection between each projection 23 and lug 22. When the casing is to be reassembled, all that is necessary is to use new lugs 22.

A valve stem comprises an upper stem part 29 and a lower stem part 30, both of non-circular cross section such as the square shape illustrated. These stem parts have confronting end faces at 31. A connecting sleeve 32 is connected to the upper stem part 29 by a bolt 33 and the lower stem part 30 by a bolt 34. The sleeve 32 has a bore corresponding in cross section to that of the stem. This sleeve 32 is weakened by an annular groove 35 which will be noted is offset from the confronting end faces 31. This offset affords increased operational strength, yet provides for the breaking of the stem parts when the set is broken. The non-circular cross section of the stem parts and sleeve establishes the driving relation between the stem parts.

The purposes of the improved frangible connection in the stem are three-fold: First, to connect the two parts of the valve stem to provide upward and downward movement of the main valve under normal operation of the hydrant; second, to transmit rotational torque from the upper stem part to the lower stem part when it is desired to remove the main valve and seat ring from the hydrant, and thirdly, to provide for the breaking at a predetermined load. In order to prevent this torsional thrust from passing through the weakened annular groove, the groove is offset from the meeting ends of the stem thereby permitting the transfer of the torque to be through the solid metal section.

The intake shoe I is formed with an inwardly opening annular groove 70 which communicates with the exterior of the intake I through the medium of a drainage port 8. The seat carriers 67 and 68 are formed with aligned ports 72 and 73 which communicate with the groove 70. Thus, when the inner end of the port 73 is opened, communication between the interior of the casing and exterior of the intake shoe is provided and any water retained in the casing will be drained off through ports 72 and 73, groove 70, and drainage port 8. Details of the shoe are more fully disclosed in divisional copending application Ser. No. 678,139 filed Sept. 20, 1967.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice.

What is claimed is:

1. In a fire hydrant, a casing comprising upper and lower casing parts having meeting ends, a comparatively wide flange outstanding from one of said parts at its meeting end and formed with a series of bolt holes, a comparatively narrow flange outstanding from the other casing part at the meeting end, at least three lugs about said narrow flange spaced from one another, each of said lugs having an aperture aligning with one of the bolt holes of said wide flange through which to receive a bolt to draw the lug against said flanges, end means operative as the lug is drawn against the flanges to pivotally engage against a cooperating face of the comparatively wide flange and a projection extending away from the body thereof axially displaced from said end for engagement against a cooperating face of said narrow flange, said projection having an intermediate zone of greater fracture susceptibility than the remaining portions thereof, and a bolt passing through each of said aligned bolt holes and apertures for drawing the engaging portions of the lug into secure engagement respectively against the engaging faces of both of said flanges.

2. In a fire hydrant, a casing comprising upper and lower parts, a comparatively wide flange outstanding from the lower end of the upper casing part formed with a series of bolt holes, a comparatively narrow flange outstanding from the upper end of said lower casing part, lugs about said narrow flange spaced from one another and having apertures aligning with the bolt holes of said wide flange through which to receive bolts to draw the lugs against said flanges, each of said lugs having end means operative as the lug is drawn against the flanges to pivotally engage against the underface of said wide flange and a projection extending away from the body thereof axially displaced from said end for engagement against the underface of said narrow flange, said projection having an intermediate zone of greater fracture susceptibility than the remaining portions thereof, and a bolt passing through each of said aligned bolt holes and apertures for drawing the lug thereat into secured engagement against both of said flanges.

3. In a fire hydrant, a casing comprising upper and lower casing parts having meeting ends, a comparatively wide flange outstanding from one of said parts at its meeting end and formed with a series of bolt holes, a comparatively narrow flange outstanding from the other casing part at the meeting end, at least three lugs about said narrow flange spaced from one another, each of said lugs having an aperture aligning with one of the bolt holes of said wide flange through which to receive a bolt to draw the lug against said flanges, an end extending oblique to the axis of its aperture to provide a partial surface engagement with said wide flange and afford a pivot area to pivot the lug relative to said wide flange surface when the lug is being drawn against said flanges, and a projection extending away from the body thereof axially displaced from said end for engagement against a cooperating face of said narrow flange, said projection having an intermediate zone of greater fracture susceptibility than the remaining portions thereof, and a bolt passing through each of said aligned bolt holes and apertures for drawing the engaging portions of the lug into secure engagement respectively against the engaging faces of both of said flanges.

4. In a fire hydrant, a casing comprising upper and lower parts, a comparatively wide flange outstanding from the lower end of the upper casing part formed with a series of bolt holes, a comparatively narrow flange outstanding from the upper end of said lower casing part, lugs about said narrow flange spaced from one another, each of said lugs having apertures aligning with the bolt holes of said wide flange through which to receive a bolt to draw the lug against said flanges, an end extending oblique to the axis of its aperture to provide a partial surface engagement with said wide flange and afford a pivot area to pivot the lug relative to said wide flange surface when the lug is being drawn against said flanges and a projection extending away from the body thereof axially displaced from said end for engagement against the underface of said narrow flange, said projection having an intermediate zone of greater fracture susceptibility than the remaining portions thereof, and a bolt passing through each of said aligned bolt holes and apertures securing the lug thereat in engagement against both of said flanges.

5. The fire hydrant casing of claims 1, 2, 3 or 4 in which said intermediate zone is located at the juncture between each projection and lug and is effected by a groove formed thereat.

6. In the fire hydrant according to claims 1, 2, 3 or 4 in which said lug apertures are of a diameter sufficiently greater than the bolt received therein to permit pivoting of the lug without providing an intermediate bending moment against the received bolt.

7. The fire hydrant of claims 1, 2, 3 or 4 in which an O-ring seal is provided between the said flange of the upper casing and the comparatively narrow flange of the lower casing.

References Cited

UNITED STATES PATENTS

| | | | |
|---|---|---|---|
| 1,127,849 | 2/1915 | Barnes | 285—2 X |
| 2,086,703 | 7/1937 | Eastman | 285—3 |
| 2,676,037 | 4/1954 | Mueller. | |
| 3,002,775 | 10/1961 | Mueller et al. | 285—2 X |
| 3,331,397 | 7/1967 | Mueller et al. | 285—2 X |

THOMAS F. CALLAGHAN, *Primary Examiner.*

U.S. Cl. X.R.

137—68, 301; 287—108